United States Patent [19]
Clarke

[11] Patent Number: 5,920,809
[45] Date of Patent: Jul. 6, 1999

[54] ANTENNA ARRAY SWITCHABLE TO PROVIDE SPATIAL SHIFT WITHOUT CHANGE OF RADIATION PATTERN

[75] Inventor: Ian M. Clarke, Disley, United Kingdom

[73] Assignee: U.S. Philips Corporation, New York, N.Y.

[21] Appl. No.: 08/663,425

[22] Filed: Jun. 17, 1996

[30] Foreign Application Priority Data

Jun. 21, 1995 [GB] United Kingdom .................. 9512620

[51] Int. Cl.$^6$ ...................................... H04B 7/02
[52] U.S. Cl. ........................ 455/272; 455/277.2; 342/368
[58] Field of Search ................... 455/562, 272, 455/277.1, 277.2, 278.1; 342/359, 360, 368, 373, 374

[56] References Cited

U.S. PATENT DOCUMENTS

| | | | |
|---|---|---|---|
| 5,345,246 | 9/1994 | Sezai | 342/368 |
| 5,581,260 | 12/1996 | Newman | 455/277.2 |
| 5,684,491 | 11/1997 | Newman et al. | 455/277.2 |
| 5,691,729 | 11/1997 | Gutman et al. | 455/277.2 |

FOREIGN PATENT DOCUMENTS

0282347A2  9/1988  European Pat. Off. ......... H04N 7/16

*Primary Examiner*—Thanh Cong Le
*Attorney, Agent, or Firm*—Robert J. Kraus

[57] ABSTRACT

A receiver comprising an antenna array having a number of antenna elements. The antenna array is fed by a feeder. Switching apparatus are arranged for switching at least a first antenna element to the feeder or at least a second antenna element to the feeder. This provides a spatial shift of the antenna array without changing its radiation pattern. This improves the signal level when poor signal reception occurs due to multipath fading.

10 Claims, 3 Drawing Sheets

ANTENNA ARRAY SWITCHABLE TO PROVIDE SPATIAL SHIFT WITHOUT CHANGE OF RADIATION PATTERN

BACKGROUND OF THE INVENTION

This invention relates to a receiver for receiving radio signals, having an antenna array comprising a plurality of antenna elements and a feed for feeding the antenna elements.

The invention also relates to an antenna array for such a receiver.

Receivers comprising antenna arrays are widely known. They can be used in situations in which a large gain factor in a specific direction is wanted. One of these situations is in a system for cellular TV. In such a system a transmitter or a small number of transmitters per cell transmit signals. The receivers are directed to one of the transmitters in order to receive the signal well.

A problem which exists especially in urban environments is the problem of multipath fading. This means that signals due to reflections reach the antenna via a plurality of different paths. Due to transmission time differences between the signals, there will be phase differences between them. Because of this, there will be some points in which the signals are added and some points in which the signals are cancelled. Therefore an interference pattern of the received signal power level with maxima and minima (nulls) will occur. When the antenna array is in or near a minimum this will result in a bad signal reception.

The problem of multipath fading is also known from other fields, e.g. cordless telephony. A solution known from that field is to have two antennas separated by a certain distance. In the situation where the first antenna is switched on and the received signal is bad, the antenna probably is near a minimum. By switching it off and switching the second antenna on, almost always a better reception can be obtained.

However, this is not an attractive solution for a receiver with an antenna array since the duplication of a whole array is awkward and expensive. Furthermore, this solution takes a relatively large amount of space.

SUMMARY OF THE INVENTION

The present invention has as an object to provide a receiver having an antenna array, which also when multipath fading occurs, has a good reception and which is simple and cheap.

Thereto a receiver according to the invention is characterized in that the antenna array comprises switching means for switching at least a first antenna element to the feed or at least a second antenna element to the feed for obtaining spatial shifting of the antenna array without changing its radiation pattern. So, a spatial shifting is obtained without having to provide a whole second antenna array. The radiation pattern should not be changed in order to keep the antenna well directed to the signal source.

An embodiment of a receiver according to the present invention is characterized in that the array comprises a number of columns of antenna-elements, and in that the switching means are arranged for switching a first edge column to the feed or switching a second edge column to the feed, the second edge column being opposite to the first. By switching between two opposite edge columns a large spatial shifting is obtained very easily.

A further embodiment of a receiver according to the present invention is characterized in that the receiver comprises detection means for detecting a decrease of a received signal strength below a threshold value and in that the switching means are arranged for automatically switching when the detection means detect such a decrease. When the signal strength falls below a threshold this means that the antenna array is positioned at a point where the signal strength is small. By switching the switching means in their other state, very probably, the received signal strength will increase.

A further embodiment of a receiver according to the present invention is characterized in that the antenna array is a planar array and in that the antenna elements are patch antennas. In this way a very manageable structure of the antenna array is obtained.

BRIEF DESCRIPTION OF THE DRAWING

The invention now will be described with reference to the accompanying drawing in which.

DESCRIPTION OF THE PREFERRED EMBODIMENT

Figure 1:
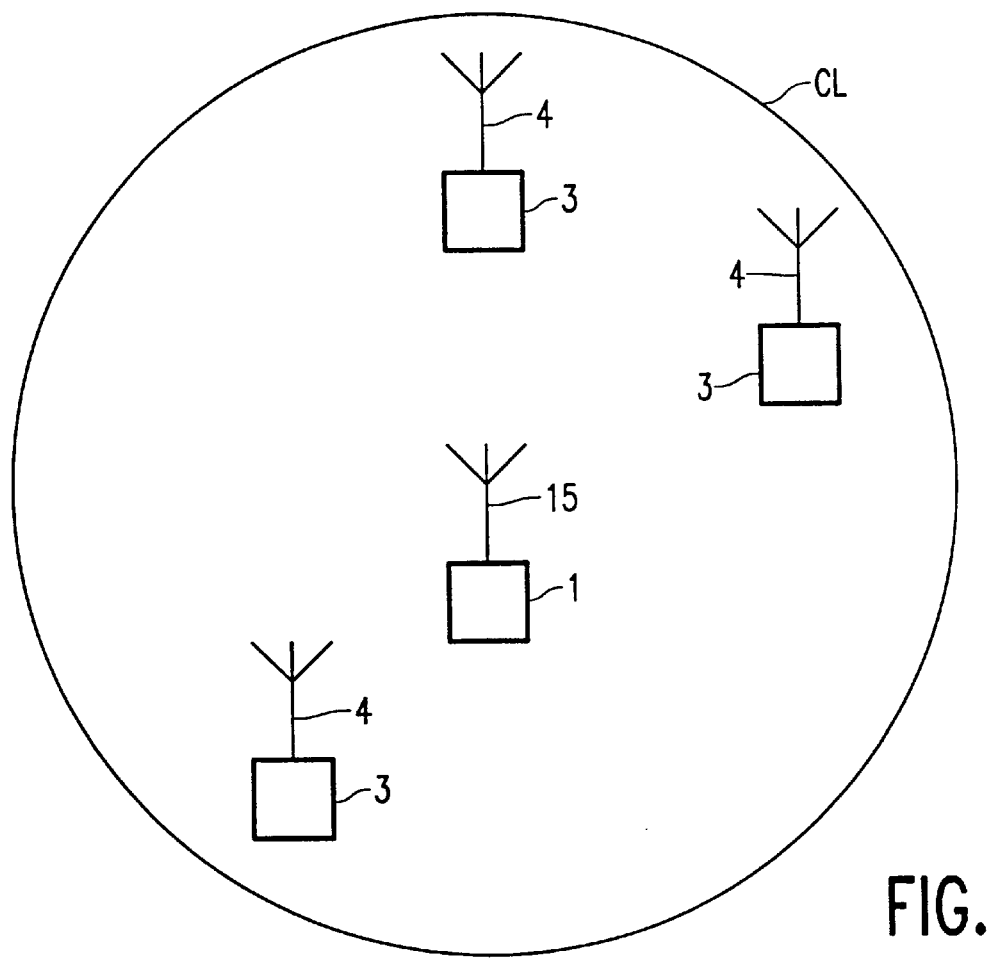
FIG. 1 shows a simplified block diagram of a cellular television system.

FIG. 1 shows a simplified block diagram of a cellular television system. Such a system is known from the European Patent Application No. 0,282,347. Herein a cellular television system is described. The system comprises an array of similar cells. Only one cell CL is indicated in the figure. In order to cover the complete cell CL, a transmitter 1, located in the centre of the cell CL, is provided with an omnidirectional antenna 15, e.g. implemented by a small number of quadrant directional radiators. A multiplexed signal is modulated onto a microwave carrier so as to allow a wide variety of signal formats to be combined efficiently. Such signals can be FM (Frequency Modulation) video signals with audio sub carriers, digital signals or the like. The band in which the signals are transmitted goes from 27.5 GHz to 29.5 GHz. The system utilizes relatively low power transmitters so as to allow for frequency reuse in a given geographical area.

The receivers 3 in the system are to be supplied with antennas 4 which have a large gain factor in the direction of the transmitter. This allows the transmitted signal power to be as low as possible. An antenna with a large gain factor can, for example, be a microstrip antenna array.

Figure 2:
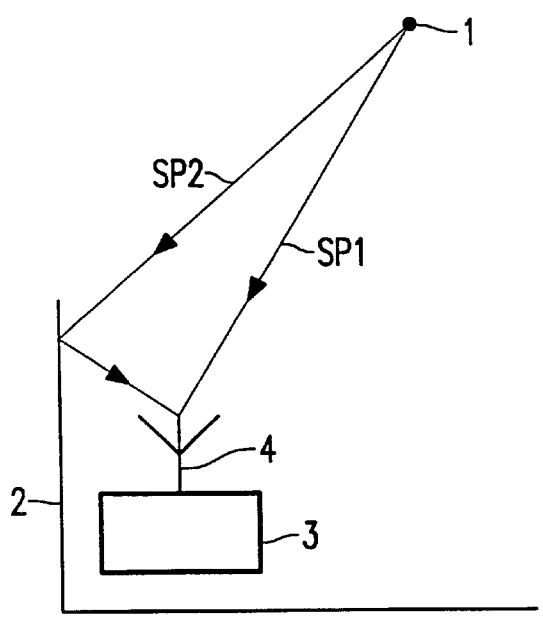
FIG. 2 shows the occurrence of multipath fading.

FIG. 2 shows in a simplified way the occurrence of multipath fading. The receiver 3 finds itself near a reflective body 2, e.g. a wall. There is one signal path SP1, directly from the transmitter 1. Another signal path SP2 goes via the wall to the receiving antenna 4. Due to this there will be a phase difference between the signals coming in via the respective signal paths SP1 and SP2. Depending on the size of this phase difference this can lead thereto, that the respective signals cancel each other or add to each other. In case of multipath fading an interference pattern will be present consisting of points in which the signals add to each other (maxima) and points in which the signals cancel each other (minima/nulls). The distance between those points is strongly dependent on the specific situation. Of course FIG. 2 shows the occurrence of multipath fading in a simplified way. Additional reflective bodies can be present, more signal paths can play a role, etc. Furthermore the interference pattern can change rapidly: Passing cars in the street, birds, even people moving within the house, all these factors have their influence.

When the antenna finds itself in a point of the interference pattern with a minimal strength (minimum) the signal reception will be bad. Moving the antenna about a wavelength, normally will give a much better reception.

Figure 3:
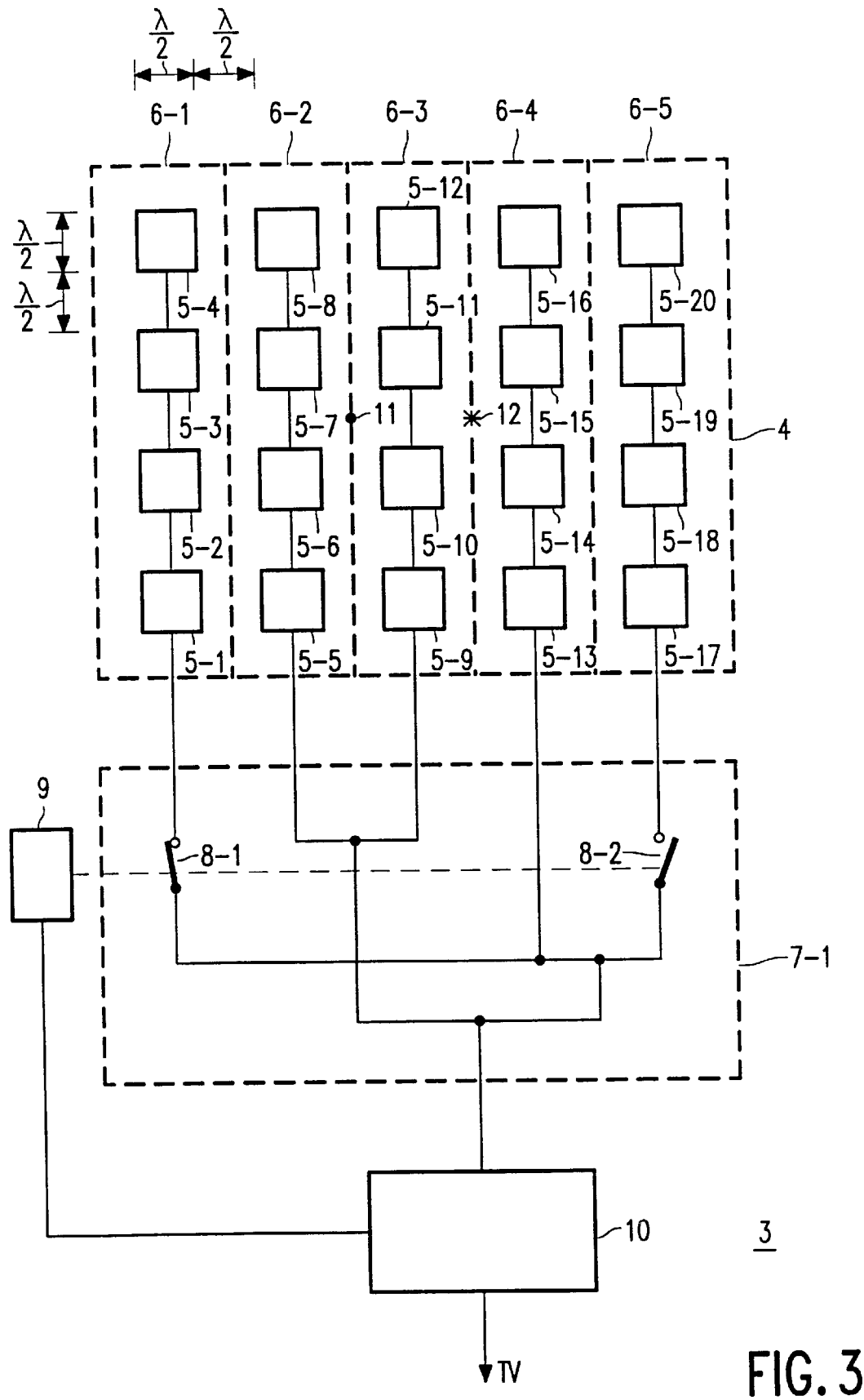
FIG. 3 shows a first preferred embodiment of a receiver according to the invention.

FIG. 3 shows a first preferred embodiment of a receiver according to the invention. The receiver comprises a microstrip antenna array 4. The antenna array comprises antenna elements 5-1 . . . 5-20. These elements are patch antennas. As is widely known, they work in the best way when they have a length which is a bit smaller than half a wavelength in free space. When a signal frequency of 29 GHz is used, the length of the antenna elements must be about 6 or 7 mm. The exact length required for the patch antennas depends on the properties of the dielectric material which is used. The antenna elements are arranged in five columns 6-1 . . . 6-5 of each having four antennas. The distance between the antennas within the column is approximately half a wavelength. The distance between the columns is also about half a wavelength. The antenna is fed by a feeder 7-1. All the columns are fed with the same phase. All the antennas within the columns are also fed with the same phase. The antenna array comprises switching means 8-1, 8-2. The switching means are arranged for switching either column 6-1 or column 6-5 to the feeder 7-1. When column 6-1 is switched to the feeder a normal 4×4 microstrip antenna array is obtained, consisting of the elements 5-1 to 5-16. This antenna array has a centre point 11 (indicated by a dot). When column 6-5 is switched to the feeder another normal 4×4 microstrip antenna array is obtained, consisting of the elements 5-5 to 5-20. This antenna array has a centre point 12 (indicated by a cross). So, only a spatial shift of the antenna array is obtained. Its radiation pattern is not changed by the switching action.

The receiver comprises furthermore down converter means 10 and detection means 9. The detection means are arranged for detecting the occurrence of bad signal reception due to multipath fading in a well known way. They calculate the ratio between the signal and the out of band noise. When this ratio falls below a certain threshold value, the presence of multipath fading is assumed. The detection means then switch the switching means to their other state. Normally this will result in a much better reception due to the spatial shift of about a wavelength between the centre points 11 and 12.

The down converter means convert the 29 GHz received signal into a signal with a much lower frequency which is transferred to a TV.

The switching means can be arranged in any suitable way. For example, PIN-diodes can be used.

Figure 4:
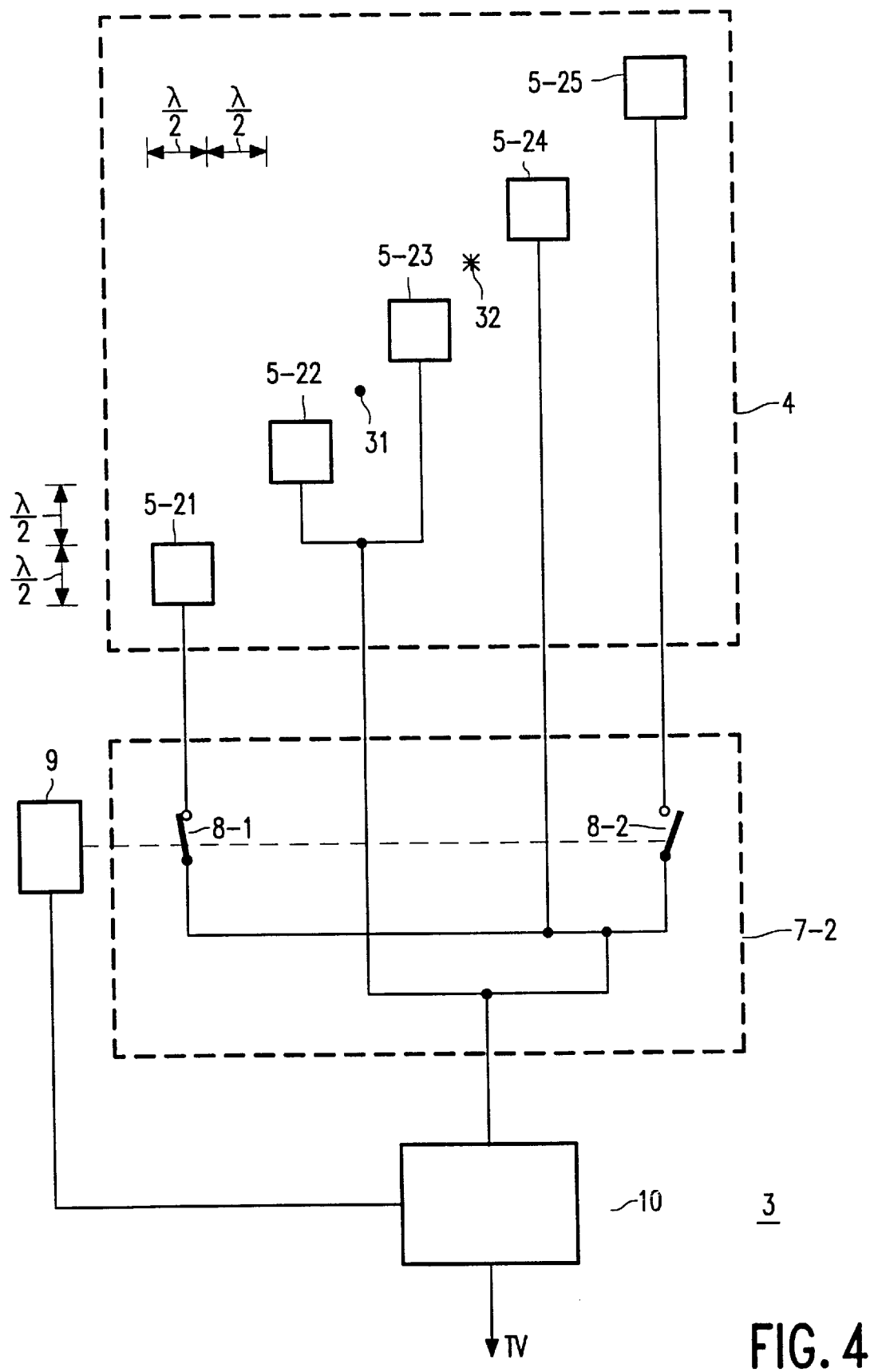
FIG. 4 shows a second embodiment of a receiver according to the invention.

FIG. 4 shows a second embodiment of a receiver according to the invention. The receiver 3 comprises an antenna array 4 consisting of five antenna elements 5-21 . . . 5-25 fed by a feeder 7-2. The switching means 8-1,8-2 are arranged to switch either the first antenna element 5-21 or the fifth antenna element 5-25 to the feeder 7. When antenna element 5-21 is switched to the feeder an antenna array is obtained consisting of the elements 5-21 to 5-24. This antenna array has a centre point 31 (indicated by a dot). When antenna element 5-25 is switched to the feeder, a microstrip antenna array is obtained consisting of the elements 5-22 to 5-25. This antenna array has a centre point 32 (indicated by a cross).

It will be understood that the embodiments shown are only meant as examples. The invention is not limited to receivers in a cellular television system, but it can be applied to all kind of receivers of radio signals. Also the implementation of the antenna array is not essential: e.g. the antenna elements can be dipoles instead of patch antennas, arrays with different numbers of columns can be used, three dimensional arrays can be used etc. Those modifications will be apparent to persons skilled in the art. The distinguishing feature of the invention is: spatial shifting within an antenna array by switching between antenna elements, without changing the radiation pattern of the array.

I claim:

1. Apparatus for receiving radio signals comprising:
   a. an antenna array including a group of antenna elements, at least one first antenna element and at least one second antenna element;
   b. a feeder apparatus for coupling selected ones of the antenna elements to a utilization device; and
   c. a switch apparatus for selectively connecting:
      (1) the at least one first antenna element and said group of antenna elements, as a first subarray, to the feeder apparatus; or
      (2) the at least one second antenna element and said group of antenna elements, as a second subarray, to the feeder apparatus;
   said first and second subarrays being spatially separated centers, but having substantially-identical radiation patterns.

2. Apparatus as in claim 1 where the array comprises a number of columns of antenna elements, said at least one first antenna element comprising a first column of said elements at a first end of the array and said at least one second antenna element comprising a second column of said elements at a second end of the array.

3. Apparatus as in claim 2 where the first and second columns of antenna elements are at opposite ends of the array.

4. Apparatus as in claim 1, wherein the apparatus comprises detection means for detecting a decrease of a received signal strength below a threshold value, and the switching means are arranged for automatically switching when the detection means detect such a decrease.

5. Apparatus as in claim 1 wherein the antenna array comprises a planar array and the antenna elements comprise patch antennas.

6. Apparatus as in claim 1, wherein the apparatus comprises detection means for detecting a decrease of a received signal strength below a threshold value, and the switching means. are arramged for automatically switching when the detection means detect such a decrease.

7. Apparatus for receiving radio signals, comprising:
   an antenna array comprising a plurality of antenna elements arranged to provide a radiation pattern,
   a feeder apparatus for coupling the antenna elements to a utilization device for received radio signals, and
   switching means for selectively switching at least first and second antenna elements of the antenna array to the feeder apparatus in a manner so as to provide a spatial shift of a centerline of the radiation pattern of the antenna array and without change of the radiation pattern of said antenna array,
   said apparatus comprising a single antenna array in which the switching means in a first position connect and disconnect the first and second antenna elements to the feeder apparatus at the same time so as to align the radiation pattern with a first centerline thereof, and in a second position thereof disconnect and connect the first and second antenna elements to the feeder apparatus at the same time so as to align the radiation pattern with a second spaced apart centerline of the radiation pattern.

8. Apparatus for receiving radio signals, comprising:

an antenna array comprising a plurality of antenna elements arranged to provide a radiation pattern, a feeder apparatus for coupling the antenna elements to a utilization device for received radio signals, and switching means for selectively switching at least first and second antenna elements of the antenna array to the feeder apparatus in a manner so as to provide a spatial shift of a centerline of the radiation pattern of the antenna array and without change of the radiation pattern of said antenna array, said antenna elements being arranged in a plurality of columns with at least one column of antenna elements directly connected to the feeder apparatus, at least first and second other columns of antenna elements connected to the feeder apparatus via the switching means, said switching means connecting the first and second other columns of antenna elements to the feeder apparatus at mutually exclusive times.

9. The receiving apparatus as claimed in claim 8 wherein said first and second other columns of antenna elements comprise the respective outer edge columns of the plurality of columns of antenna elements forming the antenna array.

10. The receiving apparatus as claimed in claim 8 comprising a signal antenna array wherein each column of antenna elements has the same number of antenna elements which are spaced apart by half a wavelength and the columns of antenna elements are spaced apart by a half wavelength.

* * * * *